United States Patent
Plotkin

(10) Patent No.: US 6,460,022 B1
(45) Date of Patent: Oct. 1, 2002

(54) PROCESS FOR PROTECTING SENSITIVE PRICE INFORMATION FROM INTERNET BASED DATA COLLECTION SYSTEMS

(76) Inventor: Joel Fredric Plotkin, 5508 Greentree Rd., Bethesda, MD (US) 20817

(*) Notice: Subject to any disclaimer, the term of this patent is extended or adjusted under 35 U.S.C. 154(b) by 0 days.

(21) Appl. No.: 09/376,955

(22) Filed: Aug. 18, 1999

(51) Int. Cl.[7] ............................................. G06F 17/00
(52) U.S. Cl. ........................................................ 705/51
(58) Field of Search ............................ 705/400, 26, 51, 705/27, 1; 708/172; 707/535, 5, 10, 3; 382/174, 178, 179, 182, 180, 185; 345/116

(56) References Cited

U.S. PATENT DOCUMENTS

| | | | |
|---|---|---|---|
| 5,825,881 A | * 10/1998 | Colvin, Sr. | 380/24 |
| 5,835,914 A | * 11/1998 | Brim | 707/206 |
| 5,875,263 A | * 2/1999 | Froessl | 382/181 |
| 5,987,457 A | * 11/1999 | Ballard | 707/5 |

FOREIGN PATENT DOCUMENTS

JP 2000099577 A * 4/2000

OTHER PUBLICATIONS

Derwent–ACC–No.: 2001–475777; Krishna, V. et al.; Jun. 2001.*

* cited by examiner

Primary Examiner—James P. Trammell
Assistant Examiner—Pierre E. Elisca

(57) ABSTRACT

A process for protecting sensitive price information from Internet based data collection systems with the steps of: analyzing specific price information and breaking each price down into a sequence of numbers, instead of representing the pricing numbers as a string of text characters on a Web page (in a specific font, etc.), represent them as a sequence of image files, set up the image files to represent each digit of the price, and display the image files sequentially to reflect a continuous pattern of numbers reflecting the actual price. The unique use of image files reflecting digits of a price make it extremely difficult for an automated Internet based data collecting system to mine price or sensitive information from the web page while still permitting users access to this information in a transparent manor. The system includes further comprising the step of randomly assigning the image file names to reduce any discernable patterns. The system includes further comprising the step of randomly changing the file names from time to time or from content to content to reduce any discernable patterns. The system includes further comprising the step of having a random quantity of digits reflected by each image file to reduce the existence of a discernable pattern. The system includes further comprising the step of having a random number of empty or dummy image files to add complexity and reduce the existence of a discernable pattern which an electronic data gather device could deduce.

5 Claims, 1 Drawing Sheet

PROCESS FOR PROTECTING SENSITIVE PRICE INFORMATION FROM INTERNET BASED DATA COLLECTION SYSTEMS

BACKGROUND OF THE INVENTION

This invention relates generally to the field of Internet Web display systems, and more particularly to a process for protecting sensitive price information from Internet based data collection systems.

Web based systems currently use text, images, and control tags to display information. Typical e-commerce systems such as electronic catalogs contain pictures of products, and text with catalog part numbers and pricing. Since a company's entire product line can usually be accessed via these electronic Web based e-commerce catalogs, the company is putting their entire pricing structure at risk to competitive analysis. One or two products priced out on the Web is not critical, but when a large number of a company's products are priced out in one system, a competitor can electronically mine the data from that system for competitive pricing information.

This process patent attempts to address this and similar issues, by making it more difficult for competitors to electronically gather the sensitive information while still providing the information to customers and others.

SUMMARY OF THE INVENTION

The primary object of the invention is to allow customers to readily access product/service price information while preventing rival companies from electronically gathering said information for competitive purposes. Another object of the invention is to be transparent to end users. Another object of the invention is to have minimal performance impact. A further object of the invention is to reduce threats from competition. Yet another object of the invention is to reduce the chances of price wars. Still yet another object of the invention is to prevent electronic price comparison. Another object of the invention is that it should primarily be used in e-commerce systems where lists of product prices concentrate pricing information in one location, making it a likely target for competitive price gathering.

Other objects and advantages of the present invention will become apparent from the following descriptions, taken in connection with the accompanying drawings, wherein, by way of illustration and example, an embodiment of the present invention is disclosed.

A process for protecting sensitive price information from Internet based data collection systems comprising the steps of: (1) analyzing specific price information and breaking each price down into a sequence of numbers, instead of representing the pricing numbers as a string of text characters on a Web page (in a specific font, etc.), represent them as a sequence of image files, (2) set up the image files to represent each digit of the price, and (3) display the image files sequentially to reflect a continuous pattern of numbers reflecting the actual price.

The drawings constitute a part of this specification and include exemplary embodiments to the invention, which may be embodied in various forms. It is to be understood that in some instances various aspects of the invention may be shown exaggerated or enlarged to facilitate an understanding of the invention.

BRIEF DESCRIPTION OF THE DRAWINGS

The system of FIG. 1 diagrams the interaction between an e-commerce Web based system containing a concentrated amount of sensitive pricing information, a competitor attempting to gather the sensitive information, and the process to prevent the electronic data gathering.

FIG. 1 also shows Internet 4, and two headed arrow 5 indicating data communication between computer 1 and third party data collection system 3.

FIG. 1 also shows table 6 including columns labeled Part, Description, and Price. Selected element 7 of table 6 shows a price contained in table 6. Digits 8 pictorially illustrate a breakdown of the selected element 7 into digits. Representations 9 of image files correspond to one or more of digits 8. Finally, FIG. 1 shows display 10 of a combined set of images sequentially displayed for a price (1215.00) shown in table 6.

FIG. 1 shows the claimed steps of analyzing (elements 6–8), representing (9), and displaying (10).

DETAILED DESCRIPTION OF THE PREFERRED EMBODIMENTS

Figure 1:
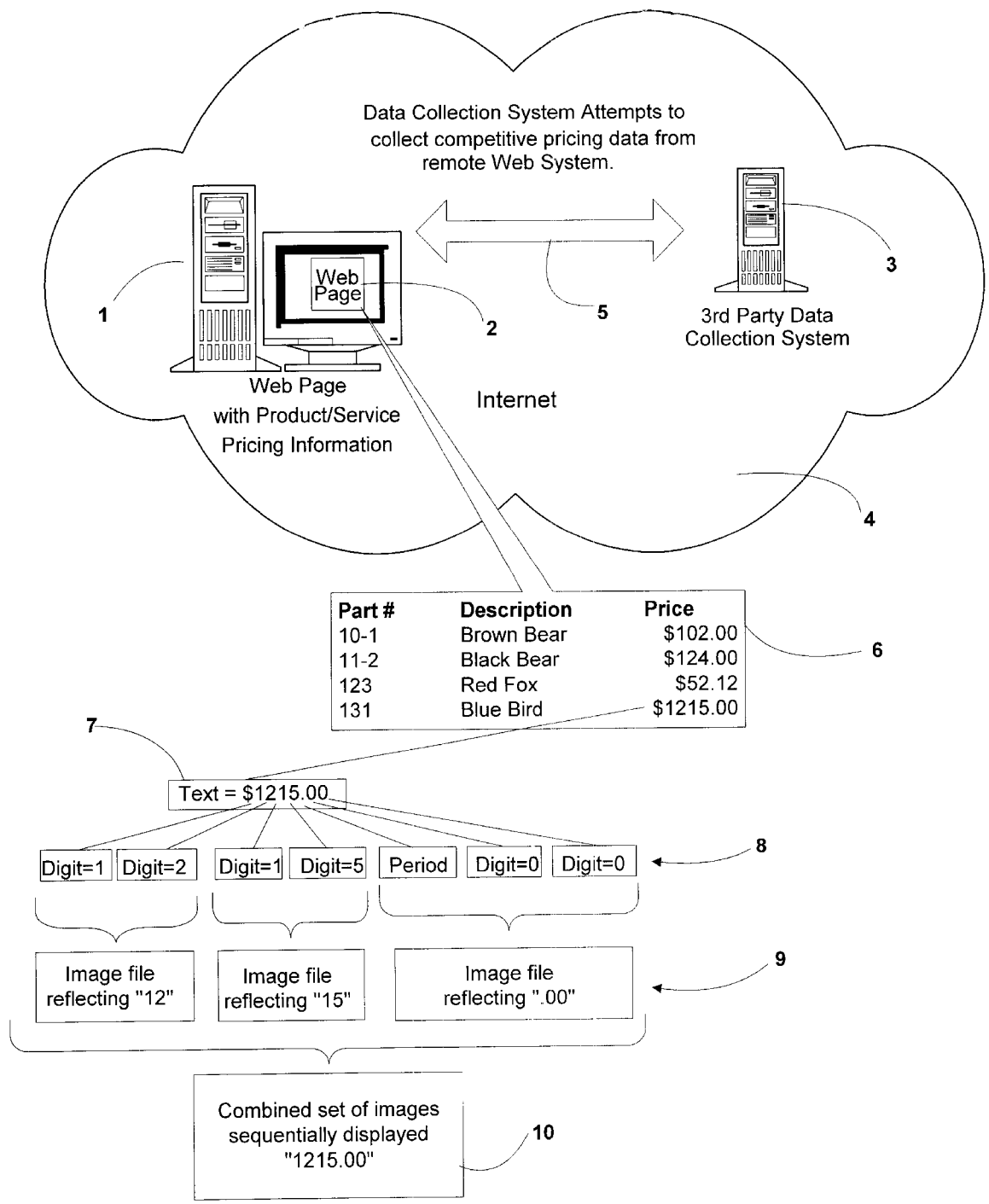
FIG. 1 shows computer 1 adjacent a display device displaying web page 2, and a third party data collection system 3.

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

As more and more companies display their products and services on the Web to existing and potential customers, a high degree of price competition is created. Competitors can electronically download each other's product and pricing information for analysis. In addition to competitors doing price analysis, online Internet Web based systems can do real-time or immediate price comparisons of similar products across two or more competing company's product lines and Web sites.

It is advantageous for companies to avoid price wars and direct price comparisons with competitors as this can lead to reduced profit margins. The following paragraphs detail a process which would facilitate this goal of allowing existing and potential customers access to product and service pricing information while preventing direct price comparisons and protecting sensitive data.

It is common place to use text and images on the Web via the Internet for displaying product and pricing information, but images are usually used to display the product appearance, etc, while text is used to relay product catalog and price information. In typical e-commerce systems, tables or pages of catalog descriptions, part numbers and prices are readily display via text. It is important to know that the text is displayed as it is relayed via a standardized representation via the underlying Web page. Since this text is in a standard convention (ASCII, UNICODE, HTML, XML, DHTML), this text can be parsed and broken down to its intermediate pieces (letters and numbers) and these components can be translated to part numbers and prices by remote Web/Internet software. In order to prevent this, while still allowing the system to function (i.e. convey meaningful information to its users) it is desirable to map the numeric pricing and part number information to a representation which can be read by the users, but not by other electronic (data mining) systems. It is a new and novel approach to map these product/service part numbers and prices to images specifically to avoid electronic parsing and gather of data.

The numbers making up the sensitive data could each be mapped to an image file. The image files could be sequentially displayed, reflecting a homogenous string of numbers, when in actually it is really a set of heterogeneous files. The image files would relay the required information to the end user, but being an image, would be hard/difficult for electronic systems to parse and interpret it. It is important to note that the process would not map an entire sequence of numbers to a single file, because this file could readily be electronically interpreted by optical character recognition (OCR) systems. By breaking the numeric string to be displayed into multiple files, this pitfall can be avoided. To further refine the system, the image file names could be randomly assigned. For example, the image of the number one may be in a file named "one.dat" or "cat.dat" thus removing any meaningful association between the file name and its contents. Since the file's image will be displayed to the end user, and not its name, this will only hamper electronic parsing, and not the distribution of information to its intended audience. Additionally, the quantity of numbers represented by each file could randomly change. For example, one file might reflect the image of the number three (3) while another file would reflect the image of the numbers one five (15). Again, this would make electronic interpretation difficult with little or no impact to the end user. Yet a third enhancement would be to intermix empty or dummy images files within the sequence to further increase complexity, reduce patterns, and increase electronic interpretation difficulty.

While the invention has been described in connection with a preferred embodiment, it is not intended to limit the scope of the invention to the particular silk form set forth, but on the contrary, it is intended to cover such alternatives, modifications, and equivalents as may be included within the spirit and scope of the invention as defined by the appended claims.

What is claimed is:

1. A process for protecting sensitive price information from Internet based data collection systems comprising the steps of:

analyzing specific price information and breaking each price down into a sequence of numbers;

representing the pricing numbers on a Web page as a sequence of image files;

setting up the image files to represent each digit of the price; and displaying the image files sequentially to reflect a continuous pattern of numbers reflecting the actual price.

2. A process as claimed in claim 1 further comprising the step of randomly assigning names to the image files to reduce the existence of a discernable pattern.

3. A process as claimed in claim 2 further comprising the step of randomly changing the image file names from time to time or from content to content to reduce the existence of a discernable pattern.

4. A process as claimed in claim 3 further comprising the step of having a random quantity of digits reflected by each image file to reduce the existence of a discernable pattern.

5. A process as claimed in claim 4 further comprising the step of having a random number of empty or dummy image files to add complexity and reduce the existence of a discernable pattern which an electronic data gather device could deduce.

* * * * *